United States Patent
Plummer et al.

(10) Patent No.: US 7,399,804 B2
(45) Date of Patent: Jul. 15, 2008

(54) COMPOSITES AND METHODS FOR THEIR PRODUCTION

(75) Inventors: Christopher Plummer, Echanders (CH); Laszlo Garamszegi, Lausanne (CH); Yves Leterrier, Lausanne (CH); Marlene Rodlert, St. Sulpice (CH); Jan-Anders E. Manson, Chexbres (CH)

(73) Assignee: Ecole Polytechnique Federale de Lausanne, Lausanne (CH)

( * ) Notice: Subject to any disclaimer, the term of this patent is extended or adjusted under 35 U.S.C. 154(b) by 187 days.

(21) Appl. No.: 10/486,958

(22) PCT Filed: Aug. 13, 2002

(86) PCT No.: PCT/GB02/03742

§ 371 (c)(1),
(2), (4) Date: Sep. 30, 2004

(87) PCT Pub. No.: WO03/016392

PCT Pub. Date: Feb. 27, 2003

(65) Prior Publication Data

US 2005/0038167 A1    Feb. 17, 2005

(30) Foreign Application Priority Data

Aug. 16, 2001 (GB) .................. 0120063.3

(51) Int. Cl.
*C08K 3/34* (2006.01)
*C08K 9/04* (2006.01)

(52) U.S. Cl. .......... 524/445; 524/493; 501/148
(58) Field of Classification Search .......... 524/445, 524/493; 501/148
See application file for complete search history.

(56) References Cited

U.S. PATENT DOCUMENTS 6,376,591 B1 * 4/2002 Lan et al. .......... 524/445
6,716,948 B1 * 4/2004 Klaerner et al. .......... 526/303.1
2002/0098309 A1 * 7/2002 Bagrodia et al. .......... 428/36.9

* cited by examiner

*Primary Examiner*—Kriellion A Sanders
(74) *Attorney, Agent, or Firm*—Patrick J. Hagan, Esq.; Dann, Dorfman, Herrell and Skillman, P.C.

(57) ABSTRACT

Intercalates and exfoliates formed from layered materials and dendritic polymers are disclosed, together with the uses of these materials, e.g. in producing composite materials. The dispersion of layered materials in a dendritic polymer matrix (hyperbranched polymers, star shaped polymers or star branched polymers) or has not been disclosed in the prior art. The high number of end-groups per molecule of dendritic polymer combined with their unique globular architectures leads to large intergallery spacings when intercalated in layered silicates and particularly facile exfoliation in spite of the high molar mass of the dendritic polymer. The excellent processability and potential high reactivity of dendritic polymers makes them extremely promising for thermoset applications, and coatings.

30 Claims, 5 Drawing Sheets

COMPOSITES AND METHODS FOR THEIR PRODUCTION

FIELD OF INVENTION

The present invention relates to novel composites and methods for their production, and more particularly to intercalates and exfoliates formed from layered materials and dendritic polymers.

BACKGROUND OF THE INVENTION

Nanocomposite technologies based on the dispersion of layered materials such as layered silicates in a polymeric matrix are expected to become extremely important in the plastics industry over the next few decades. They offer huge opportunities in a broad range of markets through unprecedented enhancement of physical properties, pushing the performance envelope well beyond the domain of known composite technologies. This is because dispersed exfoliated layered silicates consist of approximately 1 nm thick platelets with aspect ratios that can exceed 2,000, leading to a much greater specific contact area with a polymer matrix than for an equivalent volume fraction of a conventional filler. Polypropylene nanocomposites with nearly twice the stiffness and a significantly higher softening temperature (heat deflection temperature) compared with the neat resin are achievable with no loss in surface quality and a specific gravity less than 0.95. At the same time substantial increases in adhesion are anticipated, with adhesive bond strength increasing 7-fold in epoxy nanocomposites, for example. Barrier properties, flame retardance or electrical conductivity may also be improved (Ruiz-Hitzky, et al. *Adv. Mater.* 7, (1995) 180; Kato et al. *Clays and Clay Mater.* 5, (1993) 1694), and the presence of exfoliated silicate layers can result in increased viscosity and elasticity in fluids, including polymer melts. Improvements in properties such as mechanical strength, stiffness and softening temperature have been disclosed in U.S. Pat. No. 4,739,007; U.S. Pat. No. 4,810,734; U.S. Pat. No. 5,385,776.

Considerable work has consequently been devoted to the development of new synthetic methods for combining polymers and layered materials, such as smectite clays, and sodium montmorillonite in particular, by in situ polymerization of intercalated monomeric precursors (Alexandre and Dubois, *Mat. Sci. & Eng.* 28, (2000) 1). Nevertheless, for practical and economic reasons, fabricating such composites by melt or solution processing of readily available and cheap materials with minimal modification is a primary goal. There has been particular interest in identifying conditions or molecular characteristics that favor exfoliation of the layered materials in the polymer matrix (Singh and Balazs, *Polymer International* 49, (2000) 469; Ginzburg et al., *Macromolecules* 33, (2000) 1089; Zhulina et al., *Langmuir* 15, (1999) 3935), since the consequent percolation of interlayer contacts at very low loadings is thought to be determinant for many physical properties (Kojima et al., *J. Mater. Res.* 6, (1993) 1185; Messersmith and Giannelis, *Chem. Mater.* 6, (1994) 1719; Lan and Pinnavaia, *Chem. Mater.* 6, (1994) 2216). As described in WO93/04118, the incorporation of individual platelets of a highly hydrophilic exfoliated smectite clay into a polymer can be achieved by converting the hydrophilic clay into an organophilic clay by adsorption of a silane coupling agent or an onium cation, which is compatible with the polymer matrix and significantly increases the interlayer spacings. Intercalation of the organic polymer molecules between the organophilic silicate layers substantially increases the interlayer spacings still further, and the layers can be separated by high shear mixing, for example.

The most widely used swellable layered materials have negative charges or basic sites on the layers, with a commensurate number of exchangeable cations in the interlayer spaces. These include smectite clay minerals such as montmorillonite, nontronite, beidellite, volkonskoite, hectorite, saponite, sauconite, magadiite, and kenyaite. Hectorite and montmorillonite, with between about 20 basic sites and about 150 basic sites per 100 g material are among the most suitable layered materials for exfoliation or intercalation in polymer matrices. However, the exchangeable inorganic cations such as sodium or calcium ions characteristic of the native clay, the interlayer spacings do not usually exceed 0.4 nm in the dry state in air and the interlayer cohesive energy is generally too strong to permit facile exfoliation and direct dispersion into a polymer or a polymer precursor matrix.

Another important factor in facile dispersion of exfoliated layers into a polymer matrix is the strength of specific interactions between the polymer and the layers. For example, polypropylene (PP) is relatively inert and itself shows little affinity for smectite clays. However, melt intercalation and exfoliation have been reported in PP/smectite clay mixtures modified by grafting maleic anhydride to the PP, increasing its polarity and hence the strength of its interactions with the layer surfaces (Hasegawa, N. et al., *J. Appl. Poly. Sci.* 67, (1998) 87). In the case of highly functional polymers, including highly polar polymers and ionomers, for example, intrinsically strong bonding between the polymer and the silicate layers can occur through ion exchange, electrostatic complexes, direct hydrogen bonding or hydrogen bonding via water bridges in aqueous solution, chelation, dipole-dipole interactions and dispersive forces. In native smectite clays, electronegative species including oxygen in hydroxyl groups or sulfur in thiol groups may sorb to interlayer cations, such as sodium ions in sodium montmorillonite. The electronegativity should ideally be 2 or more on the Pauling scale for strong sorption to occur.

Strong interactions between a polymer and the layers in a smectite silicate nevertheless do not necessarily lead to facile exfoliation, since the presence of large numbers of functional groups on individual linear polymer molecules can give rise to bridging effects. Thus, aqueous suspensions of linear water soluble polymers such as poly vinyl pyrrolidone, poly vinyl alcohol and poly ethylene oxide have been reported to result in intercalation of smectite clays with relatively small silicate inter-gallery layer spacings, unsuitable for dispersion by high shear mixing (Ogata et al., *J. Appl. Polym. Sci.* 66, (1997) 573; Levy and Francis, *J. Colloid Interface Sci.* 50, (1975) 442; Greenland, *J. Colloid Sci.* 18 (1963) 647). Melt intercalation with polymers of this type has also been reported, but again leads to relatively small increases in gallery spacing, even after long heat treatment times (Vaia et al. *Chem. Mater.* 5, (1993) 1694).

SUMMARY OF THE INVENTION

Broadly, the present invention relates to intercalates and exfoliates formed from layered materials and dendritic polymers, and to the further uses of these materials, e.g. in producing composite materials. To our knowledge, the dispersion of layered materials in a dendritic polymer matrix has not been disclosed in the prior art. The present invention shows, however, that there are nevertheless significant and surprising advantages in combining these technologies. The high number of end-groups per molecule of dendritic polymer combined with their unique globular architectures leads to large intergallery spacings when intercalated in layered silicates and particularly facile exfoliation in spite of the high molar mass of the dendritic polymer. The excellent processability and potential high reactivity of dendritic polymers makes them extremely promising for thermoset applications, and coatings in particular, where dispersion of layered silicates is of particular interest for improving durability and barrier properties, for example. Hydroxy terminated and polyhydroxy terminated monomers have previously been disclosed to produce intercalates and exfoliates from unmodified layered silicates, including sodium montmorillonite, from aqueous dispersions in U.S. Pat. No. 6,083,559 and U.S. Pat. No. 5,830,528, but these make no specific mention of polymers as exfoliants, nor any mention of hyperbranched polymers or dendrimers or related substances.

Accordingly, in a first aspect, the present invention provides an intercalate or exfoliate formed by contacting a layered material and a dendritic polymer so that molecules of the dendritic polymer are intercalated between adjacent spaced layers of the layered material.

In a further aspect, the present invention provides a method of producing an intercalate or exfoliate, the method comprising mixing a layered material with a dendritic polymer. Preferably, this reaction takes place in the absence of onium ions, silanes or other low molar mass or monomeric coupling agents. The method may comprise the further step of drying the intercalate or exfoliate to remove the solvent, reacting the end functional groups of the dendritic polymer in the intercalate or exfoliate, e.g. to cross-link it.

The intercalates and exfoliates of the present invention can be subjected to further processing to make composite materials.

Accordingly, in one embodiment, the present invention provides a method of forming a composite material which comprises redispersing the intercalate or exfoliate in a solvent, such as water or tetrahydrofuran, and composite materials produced by the method. The method optionally comprises the initial step of drying the intercalate or exfoliate to remove any solvent remaining in the material after its production. The composites produced by redispersing the intercalate or exfoliate in a solvent can be gels, especially thixotropic gels, or pourable liquids, such as solutions and suspensions.

In a further embodiment, the present invention provides a method of producing a composite material, the method comprising crosslinking the dendritic polymer to form a crosslinked solid, and composite materials produced by the method. Conveniently, this can be accomplished by mixing the intercalate or exfoliate with a diisocyanate, e.g. in a proportion of 0 to 50% by total weight of the intercalate or exfoliate and reacting the composite thermally after drying to give a crosslinked solid.

In a further embodiment, the present invention provides a method of producing a polymer composite, the method comprising mixing a polymer matrix with an intercalate or exfoliate, and polymer composites produced by the method. Examples of polymer matrices suitable for use in this embodiment of the invention are thermoplastic matrices, e.g. poly ethylene glycol, poly ethylene oxide or poly acrylic acid. Further examples are provided below.

When layered materials such as layered silicates are combined with dendrimers or hyperbranched polymers with a dense globular architecture, with a large number of end-groups per molecule that have a high affinity for the layer surfaces, and with skeletal groups that may have little affinity for the layer surfaces, complete collapse of the polymer onto the substrate is hindered for steric or entropic reasons. It will be further hindered by any lack of interaction or repulsion between the skeletal groups and the layer surfaces. Intercalation of dendrimers or hyperbranched polymers therefore results in composites containing layered materials with relatively large gallery spacings, which are easy to exfoliate by subsequent mechanical processing or which may exfoliate during mixing. The large number of functional groups per molecule of dendritic polymers also means that not all the functional groups are required to promote exfoliation and a part of the functional groups may be assigned to other functions by chemical modification before or after mixing with the layered material. Dry exfoliated or intercalated composites may be re-dispersed in a suitable solvent for chemical modification or mixing, without re-aggregation of the layers. Modified functional groups or the original functional groups can be chosen to allow chemical, thermal or radiation crosslinking, if necessary by mixing with a co-reagent either in solution or by melt mixing. Crosslinking will give new composite materials with a range of properties from elastomers, to hard, tough materials, suitable for durable, high barrier coatings, for example.

Alternatively, the dendritic polymers may be grafted to, or mixed with long chain linear polymers, such as poly ethylene, polypropylene, polystyrene or poly methyl methacrylate or any of the other examples set out in the detailed description below, or polymers with other architectures, including short and long branched, dendritic or comb-shaped architectures. When used as additives to other polymers, master batches containing layered materials and dendritic polymers have the potential to fulfill the dual role of introducing exfoliated or intercalated layers for improved properties and acting as a processing aid, for example, leading to new combinations of properties.

Embodiments of the present invention will now be described by way of example and not limitation with reference to the accompanying figures.

DETAILED DESCRIPTION

Layered Materials

The most widely used swellable layered materials have negative charges or basic sites on the layers, with a commensurate number of exchangeable cations in the interlayer spaces. These include smectite clay minerals such as montmorillonite, nontronite, beidellite, volkonskoite, hectorite, saponite, sauconite, magadiite, and kenyaite. Hectorite and montmorillonite, with between about 20 basic sites and about 150 basic sites per 100 g material are among the most suitable layered materials for exfoliation or intercalation in polymer matrices. However, with exchangeable cations such as sodium or calcium ions, the interlayer spacings do not usually exceed 0.4 nm in the dry state in air and the interlayer cohesive energy is generally too strong to permit facile exfoliation and direct dispersion directly into a polymer matrix or polymer precursor. Therefore, it is may be advantageous to intercalate such layered materials in an aqueous suspension where the water swells the clay, making intercalation easier, particularly when the intercalant is water soluble. Even so, bridging effects are known to hinder intercalation of highly functional water soluble linear polymers under these conditions. In general, once sufficient intercalation has occurred to increase the basal spacing to greater than 2 nm after drying, exfoliation becomes relatively easy, and beyond about 5 nm, can even be spontaneous during mixing. To meet these criteria, the layered material preferably comprises less than about 75 wt %, more preferably less than about 60 wt % and most preferably less than about 45%, of the composite.

Dendritic Polymers

Figure 1:
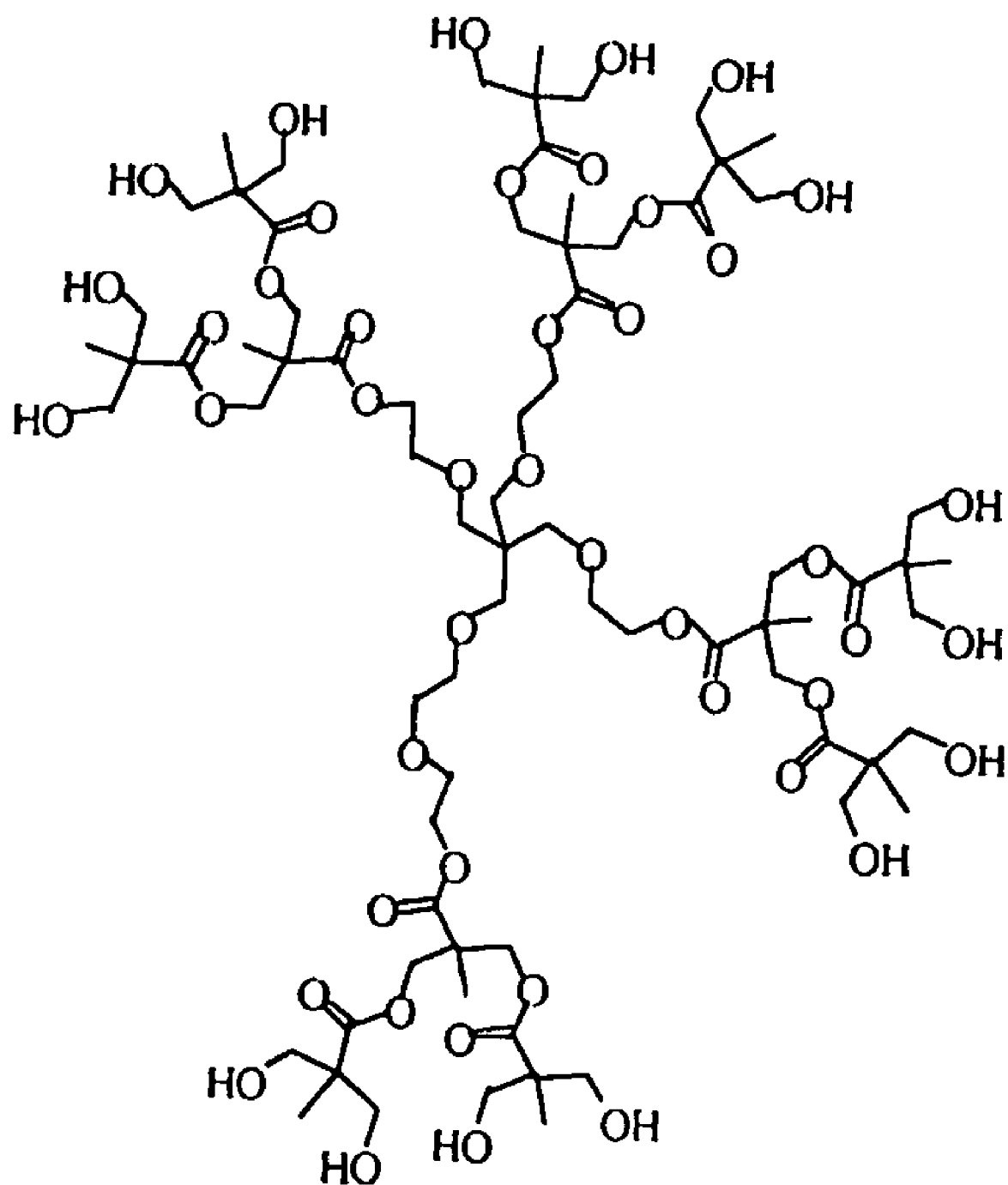
FIG. 1: Structure of a 2-generation dendrimer based on ethoxylated pentaerythritol and 2,2 bisMPA.

As used herein, the term "dendritic polymer" refers here to dendrimers, hyperbranched polymers (HBPs) and other dendron-based architectures such as star shaped and star branched polymers, and derivatives of all of the above. FIG. 1 shows a representative dendrimer, an —OH terminated water-soluble aliphatic polyester dendrimer. The dendritic or "tree-like" structure shows regular symmetric branching from a central multifunctional core molecule leading to a compact globular or quasi-globular structure with a large number of end groups per molecule. Hyperbranched polyesters with homologous structures to that in FIG. 1 have been described by Malmström et al. (*Macromolecules* 28, (1997) 1698). Whereas the dendrimers require stepwise synthesis and can be costly and time consuming to produce, hyperbranched polymers can be prepared by a simple condensation of molecules of type $AB_m$, and (usually) a $B_f$-functional core. This results in an imperfect degree of branching and some degree of polydispersity, depending on the details of the reaction. Hyperbranched polymers nevertheless conserve the essential features of dendrimers, namely a high degree of end-group functionality and a globular architecture, at an affordable cost for bulk applications (Hawker and Frechet, *ACS Symp. Ser.* 624, (1996) 132; Frechet et al., *J. Macromol. Sci.-Pure Appl. Chem. A*33, (1996) 1399; Tomalia and Durst, *Top. Curr. Chem.* 165, (1993) 193).

In general, dendritic polymers such as dendrimers and hyperbranched polymers have an average of at least 16 end groups per molecule for 2nd generation materials, increasing by a factor of at least 2 for each successive generation or pseudo-generation, certain dendritic polymers having up to 7 or more generations. The exemplary Boltorn™ polymers used in the examples provided herein is commercially available up to a 4 pseudo-generations. Number average molar masses of 2 generation or pseudo-generation dendrimers or hyperbranched polymers are usually greater than about 1500 g/mol, and the molar masses increases exponentially in generation or pseudo-generation number, reaching about 8000 g/mol for a 4 pseudo-generation polymer such as 4-generation Boltorn™. Typically the molecular weight of the dendrimers will be about 100 g/mol per end group, although this will vary according to the exact formulation.

The dendritric polymers used in the present invention are therefore distinguished from conventional highly branched polymers which may have as many end groups, but have a much higher molar mass and a much less compact structure. The dendritic polymers are (dendrimers and HBPs) are distinguished from compact highly branched species that are produced during intermediate steps in the cure of a thermoset (epoxy, for example), as these latter polymers have a very broad molar mass distribution and hence an ill-defined molar mass. Dendrimers have a single well-defined molar mass and hyperbranched polymers have well defined molar mass averages and a relatively narrow molecular weight distribution, for example having a polydispersity which is less than 5.0 and more preferably is less than 2.0.

The spacing between the layers in the intercalate or exfoliate depends on factors such as identity of the intercalant, the amount of intercalant used, and the type of processing employed. However, unlike linear polymers used in the prior art, the spacing observed for materials of the present invention employing dendritic polymers correlates with, and is preferably approximately equal to, the unperturbed molecular diameter of the polymers. The unperturbed molecular diameter of a dendritic polymers are approximately equivalent to twice the radius of gyration which for a 2 pseudo-generation HBP polymer with 16 end groups is about 1 nm. As compared to the use of essentially linear polymers in the prior art, it is surprising that the dendritic polymers used in the present invention intercalate easily in spite of having high average molar masses and functionality. This can be seen as a consequence of their compact structure which takes up much less space for a given molar mass than a linear polymer.

An example of commercially available HBPs are Boltorn™ polymers from Perstorp Chemicals. They are derived from the polycondensation of 2,2 bis-hydroxymethyl propionic acid (bisMPA) with a tetrafunctional ethoxylated pentaerythritol core, as described by Malmström et al. The different grades are referred to using a pseudo-generation number by analogy with perfect dendrimers, where the $n^{th}$ pseudo-generation corresponds to a reaction mixture containing $$4\sum_{i=0}^{n-1} 2^i$$

bisMPA molecules for every core molecule. A two pseudo-generation unmodified Boltorn™ HBP has a number average of 16 —OH functional groups per molecule, a three pseudo-generation unmodified Boltorn™ HBP has a number average of 32 —OH functional groups per molecule and a four pseudo-generation unmodified Boltorn™ HBP has a number average of 64 —OH functional groups per molecule. Unmodified HBPs of this type are glassy solids at room temperature, and combined size exclusion chromatography (SEC) and viscosity measurements in different solvents indicate a narrow molecular weight distribution and a weak dependence of the intrinsic viscosity on the molar mass, consistent with a molecular architecture close to that of a perfect dendrimer such as that in FIG. 1.

Because of their symmetrical or near symmetrical highly branched structure, dendritic polymers show considerable differences in behaviour to, and considerable advantages over linear or conventional branched polymers, as well as monomers and low molar mass molecules with comparable chemical structures. Dendritic polymers can be formulated to give a very high molecular weight but a very low viscosity, making them suitable as components in compositions such as coatings so as to increase the solids content and hence reduce volatiles, whilst maintaining processability. Dendritic polymers and HBPs in particular can be used in the preparation of products constituting or being constituents of alkyd resins, alkyd emulsions, saturated polyesters, unsaturated polyesters, epoxy resins, phenolic resins, polyurethane resins, polyurethane foams and elastomers, binders for radiation curing systems such as systems cured with ultraviolet (UV) light, infrared (IR) light or electron beam irradiation (EB), dental materials, adhesives, synthetic lubricants, microlithographic coatings and resists, binders for powder systems, amino resins, composites reinforced with glass, aramid or carbon/graphite fibers and moulding compounds based on urea-formaldehyde resins, melamine-formaldehyde resins or phenol-formaldehyde resins. By adapting their shell chemistry they can be compatibilised with a given thermoset or thermoplastic matrix and function simultaneously as processing aids, adhesion promoters, modifiers of interfacial or surface tension, toughening additives or low stress additives. They can be compatibilised with or made reactive with two or more components of a heterogeneous multicomponent polymer-based system to improve adhesion and morphological stability.

Other suitable polymers for exfoliating layered materials, such as layered silicates, include HBPs modified by grafting linear chain arms to, or growing linear chains from their end groups, such as 16 and 32 arm —OH terminated polycaprolactone star shaped polymers based on HBP cores with 16 and 32 end groups respectively, particularly if the degree of polymerisation of the polycaprolactone arms is kept low, and, ideally, if it is less than 10. By increasing the number of polar end groups for a given molecular weight, that is, by increasing the number of branches, there is a gain in affinity for the clay with respect to that of a linear homologue. Suitable materials for exfoliating layered materials, such as layered silicates, therefore also include star branched polycaprolactone polymers, in which the linear arms of the star shaped polymer are replaced by regularly or irregularly branched polycaprolactone chains attached to the HBP end groups, particularly if the degree of polymerization between branch points is kept low and, ideally, if it is less than 10. More generally, any type of star shaped or star branched polymer, in which linear or branched polymer arms are attached to a multifunctional core, or any related architecture, is suitable for the present application.

Alternative Dendritic Polymer Formulations

The nucleus of the dendritic polymer molecule is preferentially selected from a group consisting of a mono, di, tri or poly functional alcohol, a reaction product between a mono, di, tri or poly functional alcohol and ethylene oxide, propylene oxide, butylene oxide, phenylethylene oxide or combinations thereof, a mono, di, tri or poly functional epoxide, a mono, di, tri or poly functional carboxylic acid or anhydride, a hydroxy functional carboxylic acid or anhydride. Constituent mono, di, tri or poly functional alcohols are exemplified by 5-ethyl-5-hydroxymethyl-1,3-dioxane, 5,5-dihydroxymethyl-1,3-dioxane, ethylene glycol, diethylene glycol, triethylene glycol, propylene glycol, dipropylene glycol, pentanediol, neopentyl glycol, 1,3-propanediol, 2-methyl-2-propyl-1,3-propanediol, 2-ethyl-2-butyl-1,3-propanediol, cyclohexanedimethanol, trimethylolpropane, trimethylolethane, glycerol, erythritol, anhydroenneaheptitol, ditrimethylolpropane, ditrimethylolethane, pentaerythritol, methylglucoside, dipentaerythritol, tripentaerythritol, glucose, sorbitol, ethoxylated trimethylolethane, propoxylated trimethylolethane, ethoxylated trimethylolpropane, propoxylated trimethylolpropane, ethoxylated pentaerythritol or propoxylated pentaerythritol.

Chain Termination and Functionalisation of Dendritic Polymers

Chain termination of a dendritic polymer molecule is preferably obtained by addition of at least one monomeric or polymeric chain stopper to the dendritic polymer molecule. A chain stopper is then advantageously selected from the group consisting of an aliphatic or cycloaliphatic saturated or unsaturated monofunctional carboxylic acid or anhydride having 1-24 carbon atoms, an, aromatic monofunctional carboxylic acid or anhydride, a diisocyanate, an oligomer or an adduct thereof, a glycidyl ester of a monofunctional carboxylic or anhydride having 1-24 carbon atoms, a glycidyl ether of a monofunctional alcohol with 1-24 carbon atoms, an adduct of an aliphatic or cycloaliphatic saturated or unsaturated mono, di, tri or poly functional carboxylic acid or anhydride having 1-24 carbon atoms, an adduct of an aromatic mono, di, tri or poly functional carboxylic acid or anhydride, an epoxide of an unsaturated monocarboxylic acid or corresponding triglyceride, which acid has 3-24 carbon atoms and an amino acid. Suitable chain stoppers are, for example, formic acid, acetic acid, propionic acid, butanoic acid, hexanoic acid, acrylic acid, methacrylic acid, crotonic acid, lauric acid, linseed fatty acid, soybean fatty acid, tall oil fatty acid, dehydrated castor fatty acid, crotonic acid, capric acid, caprylic acid, acrylic acid, methacrylic acid, benzoic acid, para-tert-.butyl benzoic acid, abietic acid, sorbic acid, 1-chloro-2,3-epoxypropane, 1,4-dichloro-2,3-epoxybutane, epoxidized soybean fatty acid, trimethylol propane diallyl ether maleate, toluene-2,4-diisocyanate, toluene-2,6-diisocyanate, hexamethylene diisocyanate, phenyl isocyanate and/or isophorone diisocyanate. It is emphasized that the aforementioned chain stoppers include compounds with or without functional groups. A functionalization of a dendritic polymer molecule (with or without chain termination) is preferably a nucleophilic addition, anoxidation, an epoxidation using an epihalohydrin such as epichlorohydrin, an allylation using an allylhalide such as allylchloride and/or allyl bromide, or a combination thereof. A suitable nucleophilic addition is, for example, a Michael addition of at least one unsaturated anhydride, such as maleic anhydride. Oxidation is preferably performed by means of an oxidizing agent. Preferred oxidizing agents include peroxy acids or anhydrides and haloperoxy acids or anhydrides, such as peroxyformic acid, peroxyacetic acid, peroxybenzoic acid, m-chloroperoxybenzoic acid, trifluoroperoxyacetic acid or mixtures thereof, or therewith. Oxidation may thus result in, for example, primary and/or secondary epoxide groups. To summarize, functionalization refers to addition or formation of functional groups and/or transformation of one type of functional groups into another type. Functionalization includes nucleophilic addition, such as Michael addition, of compounds having functional groups, epoxidation/oxidization of hydroxyl groups, epoxidation of alkenyl groups, allylation of hydroxyl groups, conversion of an epoxide group to anacrylate or methacrylate group, decomposition of acetals and ketals, grafting and the like.

Composite Materials

Nanocomposites containing exfoliated layered silicates have particular potential as additives or precursors, particularly in reactive systems such as those described by Johansson et al., *J. Coatings Technology* 72, (2000) 49. Modifying the HBPs in the presence of exfoliated sodium montmorillonite is therefore of great interest. As shown in example 3 above, redispersion of the HBP/sodium montmorillonite nanocomposites can lead to stable suspensions in an organic solvent. Therefore chemical modification or blending can be carried out via a solution route without aggregation of the silicate layers. Conversion of the HBP end groups to more hydrophobic functions may nevertheless result in re-agglomeration of the silicate layers or even precipitation of the HBP from a polar solvent. In such cases, partial modification of the —OH groups or a replacement of part of the —OH groups by other suitable polar groups should be used.

Conversion to acrylate groups in situ can be used to produce photo-crosslinkable nanocomposite resins. Other examples of suitable modifications for obtaining reactive resins are given below.

In example 3, the product is a polyurethane: in general, polyurethanes are formed through an addition reaction between isocyanates or polyisocyanates and alcohols, polyalcohols or phenols so that no modification of the —OH terminated HBP is required apart from mixing with the second reactive component.

Other thermoset compounds or resins include epoxy thermoset resins, polyesters, allyl resins, amino resins, phenolics, silicone resins, polyimides, furan resins and polyisocyanates. Epoxy functionalization of —OH terminated dendritic polymers may be carried out as described in herein to produce a reactive component for an epoxy thermoset resin for example, for use with hardeners, accelerators or crosslinking resins, such as amines, amides, polyamines, polyamides, dicyandiamides, Lewis acids, isocyanates, functional urethanes or polyurethanes, acid anhydrides, phenol-formaldehyde resins and/or amino resins.

Thermosetting polyesters can be produced from such compounds as phthalic or maleic anhydrides and —OH terminated dendritic polymers. Amino resins may be obtained by combining —OH terminated dendritic polymers with a compound containing an amino group. The two most important types of amino resins used in moulding compositions are methylolmelamines and methylolureas. Etherified amino resins, including methylated amino resins, such as hexamethoxymethylmelamine, and butylated melamines and ureas, are important as amino crosslinkers for curing of coating compositions, such as paint films. A dendritic polymer nanocomposite or reactive dendritic polymer nanocomposite can also be used as an additive to any thermoset system of which the above systems are examples or as an additive for thermoplastics. There is particular potential for HBP-based nanocomposites as or as components of resins for macroscopic fiber-reinforced composites, where significant benefits are anticipated for processing, for example. Conventional inorganic fillers lead to poor impregnation characteristics and the presence of the HBP is expected to improve the flow properties substantially with respect to those of conventional polymer-based formulations. Moreover, the presence of HBPs and highly dispersed silicates should allow extensive control of shrinkage and internal stress build-up, and hence improved surface finish and surface properties. In such applications only low HBP contents may be required and masterbatches will contain correspondingly high silicate contents, ideally up to more than 70 weight % silicate. A list of examples of thermoplastic matrices that are suitable for combination with HBP or other dendritic polymer-based nanocomposite masterbatches is provided below.

In all the above examples, the dendritic polymer may be chemically modified to impart additional functionality to the material in question, such as fluorescent groups, biologically active groups, compatibilising groups, surface active groups or any other required function, depending on the application in question.

Dendritic polymer nanocomposite-based gels such as produced in the first stage of solution processing or by later addition of a water to a dried dendritic polymer nanocomposite, can also incorporate a wide variety of functional compounds including cosmetic, industrial, and medicinal compounds that act on contact with the skin or hair, for example (including antiperspirants, antidandruff agents, antibacterial compounds, antifungal compounds, anti-inflammatory compounds, anesthetics, sun screens and other cosmetic and medical functions), or are used to adjust rheology of industrial greases, for example. A functional compound can either be dissolved in the dendritic polymer nanocomposite-based gel or can be homogeneously dispersed throughout the gel as an insoluble, particulate material, or be attached chemically to the HBP. In the case of gels containing water as the only solvent, none of the base components, that neither the Boltorn™ HBPs nor the sodium montmorillonite clay is toxic, making them suitable for biological applications.

Thermoplastic Polymers Suitable for Producing Composites

Useful thermoplastic resins, which may be used alone or in admixture, are polyactones such as poly(pivalolactone), poly (caprolactone) and similar polymers; polyurethanes derived from reaction of diisocyanates such as 1,5-naphthalene diisocyanate; p-phenylene diisocyanate, mphenylene diisocyanate, 2,4-toluenediisocyanate, 4,4'-diphenylmethane diisocyanate, 3,3'-dimethyl-4,4'-biphenyl diisocyanate, 4,4'-diphenylisopropylidene diisocyanate, 3,3'-dimethyl4,4'-diphenyl diisocyanate, 3,3'-dimethyl-4,4'-diphenylmethane diisocyanate, 3,3'-dimethoxy4,4'-biphenyl diisocyanate, dianisidine diisocyanate, toluidine diisocyanate, hexamethylene diisocyanate, 4,4'-diisocyanatodiphenylmethane and similar polymers and linear long-chain diols such as poly(tetramethylene adipate), poly(ethylene adipate), poly(1,4-butylene adipate), poly(ethylene succinate), poly(2,3-butylenesuccinate), poly ether diols and similar polymers; polycarbonates such as poly[methane bis(4-phenyl) carbonate], poly[1,1-ether bis(4-phenyl) carbonate], poly[diphenylmethane bis(4-phenyl)carbonate], poly[1,1-cyclohexane bis(4phenyl)carbonate] and similar polymers; polysulfones; polyethers; polyketones; polyamides such as poly(4-amino butyric acid), poly(hexamethylene adipamide), poly(6-aminohexanoic acid), poly(m-xylylene adipamide), poly(p-xylylene sebacamide), poly(2,2,2-trimethyl hexamethylene terephthalamide), poly(metaphenylene isophthalamide), poly(p-phenylene terephthalamide), and similar polymers; polyesters such as poly(ethylene azelate), poly(ethylene-1,5-naphthalate, poly(1,4-cyclohexane dimethylene terephthalate), poly (ethylene oxybenzoate), poly(parahydroxy benzoate), poly (1,4-cyclohexylidene dimethylene terephthalate) (cis), poly (1,4cyclohexylidene dimethylene terephthalate) (trans), poly ethylene terephthalate, polybutylene terephthalate and similar polymers; poly(arylene oxides) such as poly(2,6-dimethyl-1,4phenylene oxide), poly(2,6-diphenyl-1,4-phenylene oxide) and similar polymers; poly(arylene sulfides), such as poly(phenylene sulfide) and similar polymers; polyetherimides; vinylpolymers and their copolymers, such as polyvinyl acetate, polyvinyl alcohol, polyvinyl chloride; polyvinyl butyral, polyvinylidene chloride, ethylene-vinyl acetate copolymers and similar polymers; polyacrylics, polyacrylate and their copolymers, such as poly ethyl acrylate, poly(n-butyl acrylate), polymethyl methacrylate, poly ethyl methacrylate, poly(n-butyl methacrylate), poly(npropyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers and similar polymers; polyolefins, such as low density poly(ethylene), poly(propylene), chlorinated low density poly(ethylene), poly(4-methyl-1-pentene), poly(ethylene), poly(styrene), and similar polymers; ionomers; poly(epichlorohydrins); poly(urethane), such as the polymerization product of diols, such as glycerin, trimethylolpropane, 1,2,6-hexanetriol, sorbitol, pentaerythritol, polyether polyols, polyester polyols and similar compounds with a polyisocyanate such as 2,4-tolylenediisocyanate, 2,6-tolylene diisocyante, 4,4'-diphenylmethane diisocyanate, 1,6-hexamethylene diisocyanate, 4,4'-dicyclohexylmethane diisocyanate and similar compounds; polysulfones, such as the reaction product of the sodium salt of 2,2-bis(4-hydroxyphenyl) propane and 4,4'-dichlorodiphenyl sulfone; furan resins, such as poly(furan); cellulose ester plastics, such as cellulose acetate, cellulose acetate butyrate, cellulose propionate and similar polymers; silicones, such as poly(dimethyl siloxane), poly(dimethyl siloxane), poly(dimethyl siloxane co-phenylmethylsiloxane) and similar polymers; protein plastics; blends of two or more of the aforementioned substances. Vulcanizable and thermoplastic rubbers useful as matrix polymers include brominated butyl rubber, chlorinate butyl rubber, polyurethane elastomers, fluoroelastomers, polyester elastomers, polyvinylchloride, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers made up of segments of glassy or crystalline blocks such as poly(styrene), poly(vinyl-toluene), poly(t-butyl styrene), polyesters and the like and the elastomeric blocks such as poly(butadiene), poly(isoprene), ethylenepropylene copolymers, ethylene-butylene copolymers, polyether and similar polymers, such as the poly(styrene)-poly(butadiene)-poly(styrene) block copolymer manufactured by Shell Chemical Company under the trade name KRATON™.

EXAMPLES

The following examples pertain to Boltorn™ HBPs and sodium montmorillonite clay, but other suitable intercalants or exfoliants for layered silicate materials in general, including sodium montmorillonite, are any soluble or partly soluble dendritic polymer with appropriate end functionality such as hydroxyl, thiol, amine functionality, and, in particular, analogous structures to Boltorn™ HBPs and their derivatives, including those listed above. Perfect dendrimers are not considered explicitly in the examples to be given in what follows since their practical use for bulk applications is likely to be limited for cost reasons. However, the methods exemplified herein are equally applicable to dendrimers.

Example 1

Method for Exfoliated and Intercalated Silicates in an HBP Matrix

Figure 2:
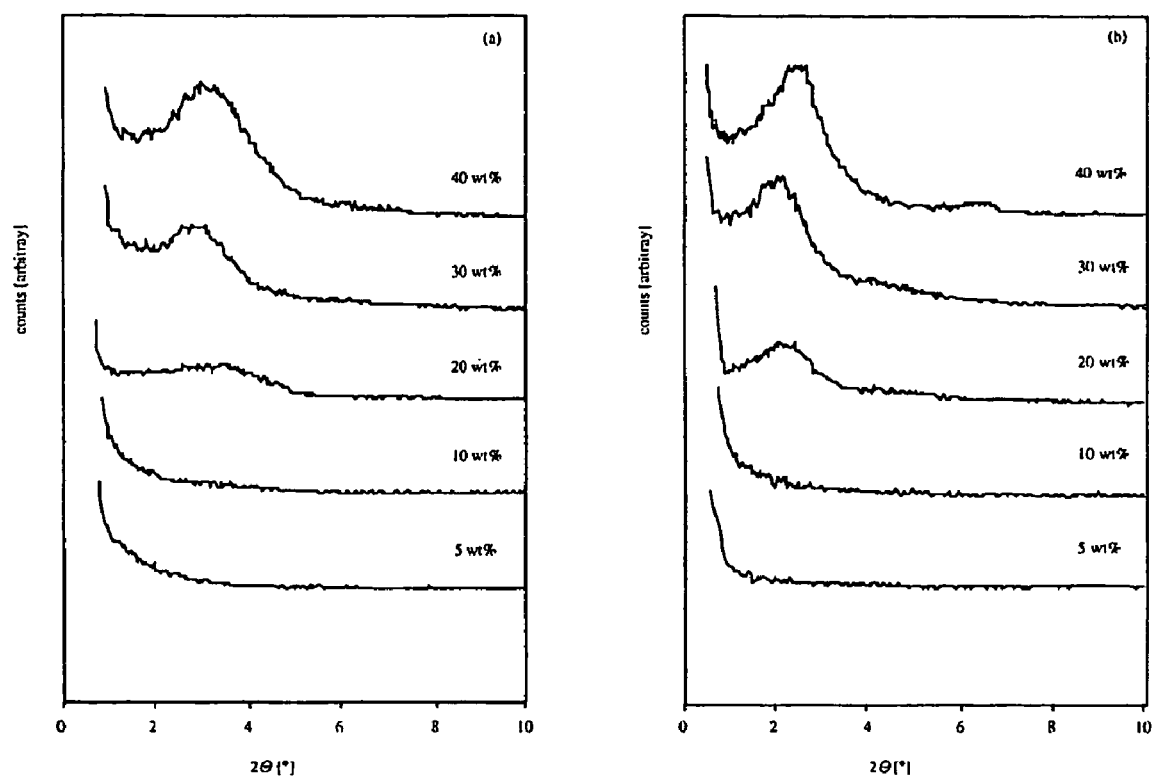
FIG. 2: Wide angle X-ray scattering data for HBP/sodium montmorillonite nanocomposites dispersed in water and dried containing different weight fractions of sodium montmorillonite as indicated: (a) two pseudo-generation HBP; (b) four pseudo-generation HBP: the main peak corresponds to the basal spacing of the layered silicate, a smaller scattering angle implying a larger basal spacing.

The required weight fraction of sodium montmorillonite clay is mixed at about 50° C. with about 10 g of two, three or four pseudo-generation —OH terminated Boltorn™ HBP dispersed in 75 ml of deionized water, and the water left to evaporate in air under stirring with a magnetic stir bar at about 1 rotation per second. After evaporation of sufficient water to give a thixotropic gel, the gel is transferred to an open silicone rubber mould and dried in air at about 30 to 60° C. for a day. Drying is continued at about 80 to 140° C. under vacuum for a further two days. The resulting solids are ground, pressed into 25 mm diameter 1 mm thick disks at about 50 to 100° C. between poly imide sheets, using a hydraulic press, and stored in a dessicator. Wide angle X-ray scattering data for two and four pseudo-generation HBPs with different sodium montmorillonite contents prepared from aqueous dispersions are shown in FIG. 2. At the highest sodium montmorillonite contents shown, the pressed specimens are opaque with a smooth, matte surface. The data for specimens prepared from the four pseudo-generation HBP indicate 3.6 to 3.9 nm basal spacings of the silicate layers, whereas for the two pseudo-generation HBP, 2.5 to 2.8 nm spacings are observed at high sodium montmorillonite contents, and 2.8 to 3 nm for the three pseudogeneration H BP. This compares with a basal spacing of 1.06 nm in the as-received sodium montmorillonite stored in air, proving intercalation to occur and the basal spacing to increase to a range suitable for mechanical exfoliation (greater 2 nm and preferably greater than 3 nm). As shown in FIG. 2, no wide angle X-ray scattering peak corresponding to the montmorillonite basal spacing is observed in composites containing 5 and 10 wt % sodium montmorillonite for two and four pseudo-generation HBPs, nor are they observed for the three pseudo-generation HBP (not shown). In this range of compositions, the pressed specimens are transparent. Exfoliation in these transparent specimens is confirmed by transmission microscopy observations. At higher sodium montmorillonite content, the structure is disordered at low magnification, but stacks of 5 to 10 silicate layers with a relatively well-defined spacing persist, consistent with the wide angle X-ray scattering results. These stacks are interspersed with individual exfoliated silicate layers. Similar results are obtained for two, three and four pseudo-generation HBPs. The observation of increasing basal spacings with pseudo-generation number in the HBP/sodium montmorillonite intercalated composites is thought to be a consequence of the increase in nominal molar mass. The absolute interlayer spacings are consistent with simple estimates of the molecular sizes from self-avoiding rotational isomeric state simulations of isolated ideal 2, 3 and 4 generation dendritic molecules and direct estimates of the HBP hydrodynamic radii from size exclusion chromatography. The observation of exfoliation at relatively low clay contents shows the intercalated state to be unstable so that, if necessary, exfoliation may be achieved by further mechanical processing either in solution or in the melt state.

Example 2

Method for Intercalated Layered Silicates in an HBP Matrix

Figure 3:
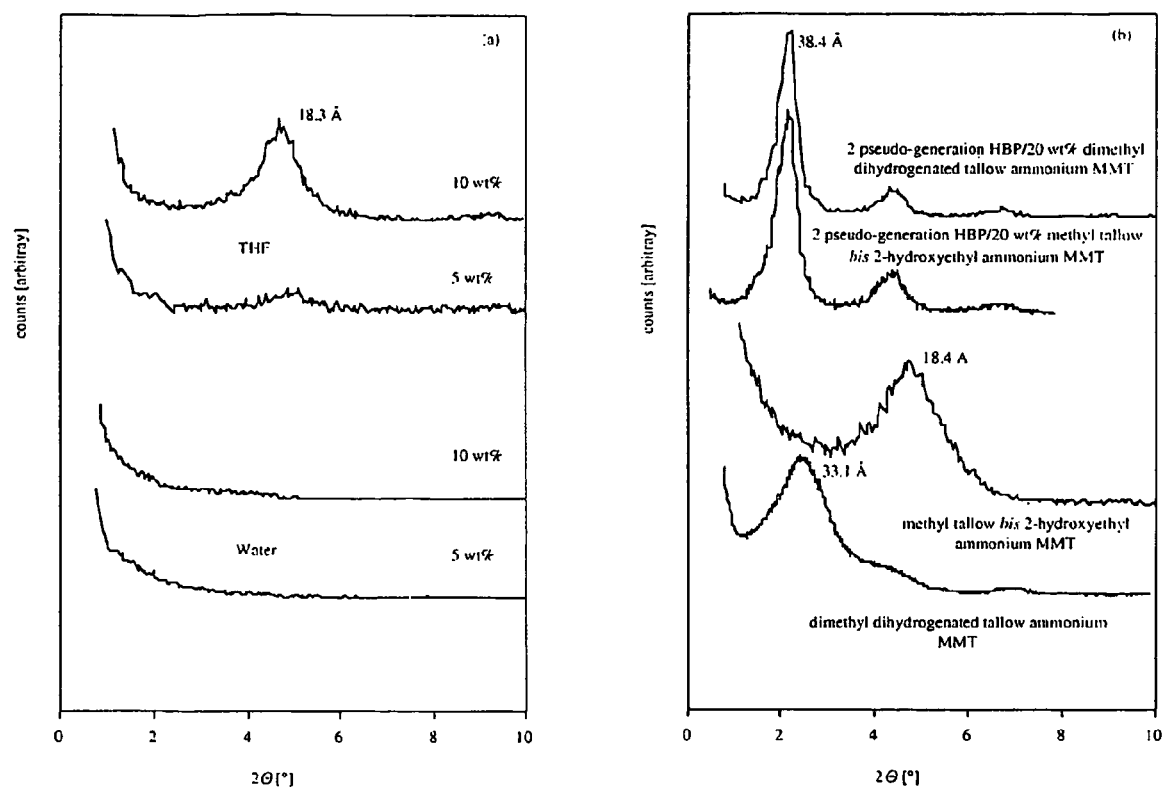
FIG. 3: Wide angle X-ray scattering data for HBP/sodium montmorillonite nanocomposites: (a) two pseudo-generation HBP/sodium montmorillonite nanocomposites dispersed in THF and water and dried; (b) two pseudo-generation HBP/organically modified montmorillonite blends dispersed in THF and dried, and the modified clays as-received (methyl tallow bis 2hydroxyethyl ammonium montmorillonite and dimethyl dihydrogenated tallow ammonium montmorillonite).

The required weight fraction of sodium montmorillonite or organically modified sodium montmorillonite clay is mixed at about 50° C. with about 10 g of two, three or four pseudo-generation —OH terminated Boltorn™ HBP dispersed in 75 ml of tetrahydrofuran (THF). The THF is left to evaporate in air under stirring with a magnetic stir bar set to about 1 rotation per second. After evaporation of sufficient THF to give a thixotropic gel, the gel is transferred to an open silicone rubber mould and dried under vacuum at about 30 to 50° C. for a further two days. The resulting solids are ground, pressed into 25 mm diameter 1 mm thick disks at 50 to 100° C. between poly imide sheets, using a hydraulic press, and stored in a dessicator. With tetrahydrofuran as the solvent, intercalation is observed in HBP/sodium montmorillonite prepared in this way at all compositions investigated. This is illustrated in FIG. 3, in which nanocomposites prepared using THF or water and the two pseudo-generation HBP are compared. At 5 wt % sodium montmorillonite and above, clear diffraction peaks corresponding to a basal spacing of about 2 nm are visible for the THF-based system, indicating intercalation. Much larger interlayer spacings are obtained by using organically modified clays in place of the HBP/sodium montmorillonite, with no correlation with the initial interlayer spacing of the modified clay. FIG. 3(b) shows results for composites for two pseudo-generation HBP and methyl tallow his 2-hydroxyethyl ammonium montmorillonite and dimethyl hydrogenated tallow ammonium montmorillonite, along with data for the organically modified clays prior to mixing. Similar results are obtained with the three and four pseudo-generation HBPs.

Example 3

Method for Exfoliated Layered Silicates in Cross-linked HBP Matrix

Figure 4:
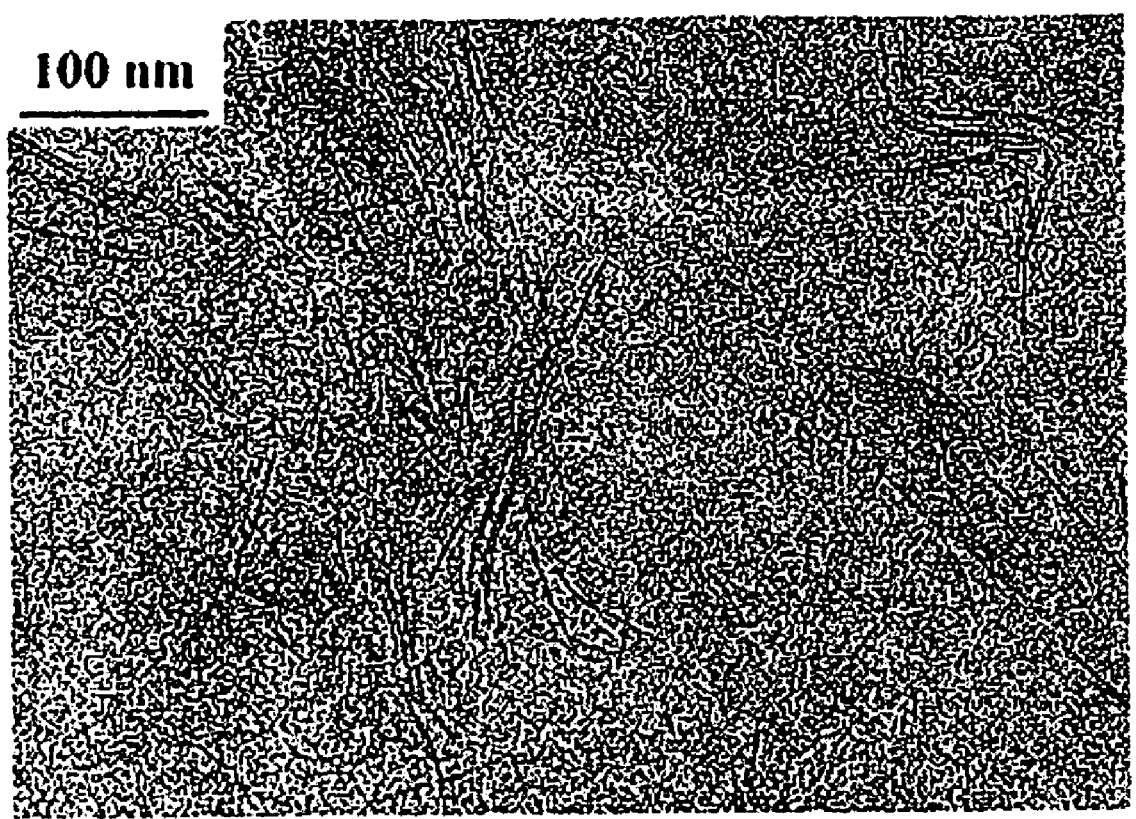
FIG. 4: Transmission electron microscopy micrograph of a two pseudo-generation HBP/sodium montmorillonite nanocomposite containing 10 wt % sodium montmorillonite that has been mixed with 50 wt % aromatic diisocyanate in THF, dried at room temperature and reacted at about 100° C., showing exfoliated structure.

Two, three or four pseudo-generation HBP/10 wt % sodium montmorillonite, prepared from a dispersion in water as in Example 1, is carefully dried and re-dispersed in THF and mixed in solution with between about 20 and 50 wt % of an aromatic diisocyanate, diphenyl methyl diisocyanate (MDI). After evaporation of the THF at room temperature under vacuum, the system is cured at between 50 and 100° C. under vacuum to give a hydrophobic glassy amorphous solid at high MDI content or a rubbery solid at low MDI content. Wide angle X-ray scattering and transmission electron microscopy show the initial exfoliated state of the silicate layers to be maintained (FIG. 4).

Figure 5:
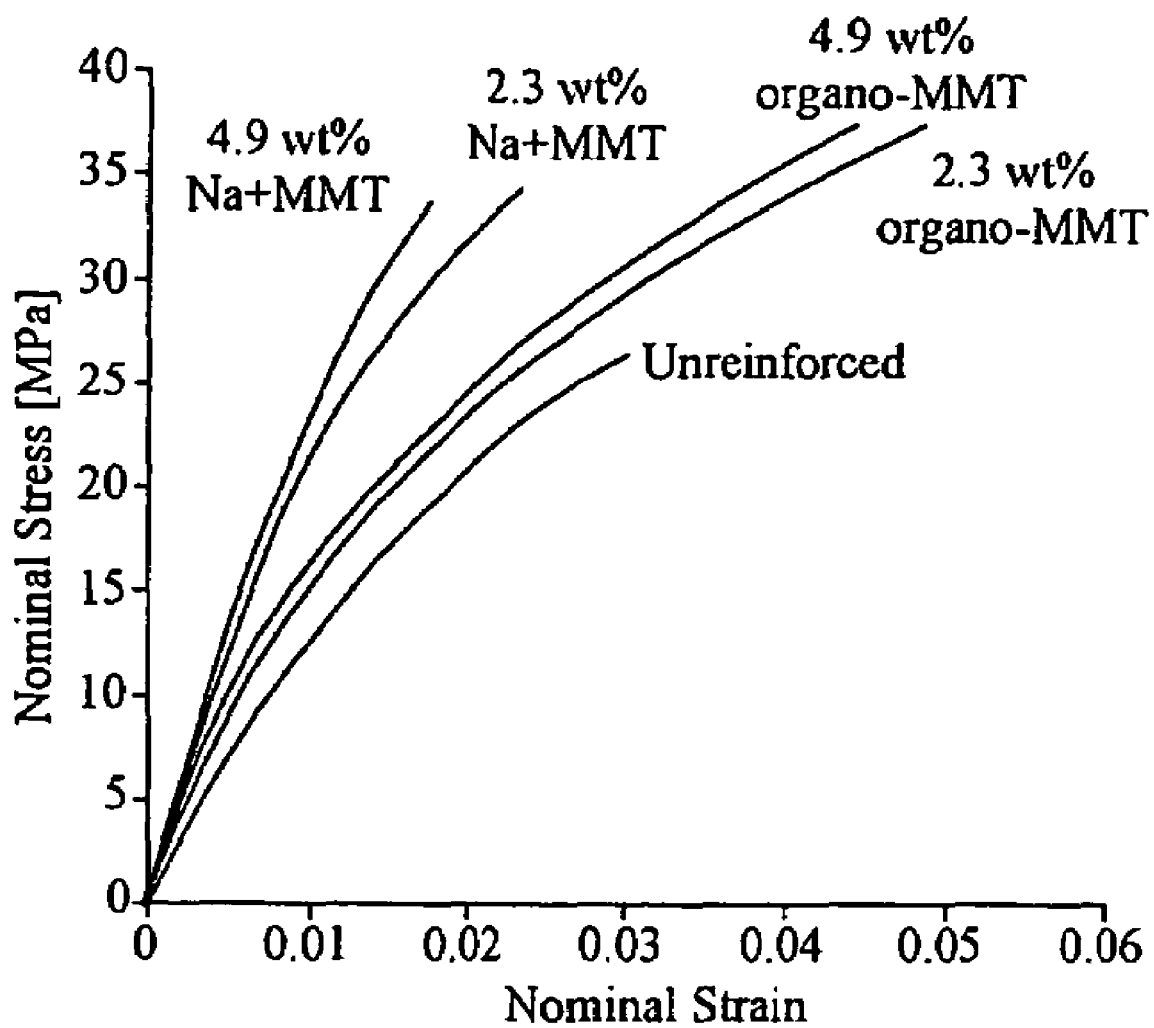
FIG. 5: Comparison of room temperature tensile stress-strain curves in two pseudo-generation HBP/exfoliated sodium montmorillonite (Na+MMT) and two pseudo-generation HBP/unexfoliated organically modified montmorillonite (organo-MMT), mixed with aromatic diisocyanate in THF and reacted at about 100° C., for different filler contents.

As shown in FIG. 5, the exfoliation of the sodium montmorillonite in the resulting composites leads to a significant increase in stiffness and an increase in ultimate tensile strength, even at relatively low montmorillonite contents. As also shown in FIG. 5, composites with the same matrix composition, but containing unexfoliated organically modified montmorillonite, show a much less marked improvement in stiffness over the unfilled matrix for a given montmorillonite content.

Example 4

Method for Exfoliated Layered Silicates in HBP/Poly Acrylic Acid Blends

Two, three or four pseudo-generation HBP containing 10 to 30 wt % sodium montmorillonite, prepared from a dispersion in water as in Example 1, is re-dispersed in water and mixed at about 50° C. with between 50 and 80 wt % of linear poly acrylic acid of weight average molar mass of up to at least 250,000 g/mol. After evaporation of sufficient water to give a thixotropic gel, the gel is transferred to an open silicone rubber mould and dried in air at about 30 to 60° C. for a day. Drying is continued at about 80 to 140° C. under vacuum for a further two days. The resulting solids are ground, pressed into 25 mm diameter 1 mm thick disks between poly imide sheets, using a hydraulic press, and stored in a dessicator. The resulting specimens are homogeneous and transparent. Wide angle X-ray scattering shows the silicate layers to be exfoliated at all compositions, that is from 0.2 to 15 wt % sodium montmorillonite.

Example 5

Method for Exfoliated Layered Silicates in HBP/Poly Ethylene Oxide Blends

Two, three or four pseudo-generation HBP containing 10 to 30 wt % sodium montmorillonite, prepared from a dispersion in water as in Example 1, is re-dispersed in water and mixed at 50° C. with between 50 and 80 wt % of linear poly ethylene oxide of weight average molar mass of up to at least 20,000 g/mol. After evaporation of sufficient water to give a thixotropic gel, the gel is transferred to an open silicone rubber mould and dried in air at about 30 to 60° C. for a day. Drying is continued at about 80 to 140° C. under vacuum for a further two days. The resulting solids are ground, pressed into 25 mm diameter 1 mm thick disks between poly imide sheets, using a hydraulic press, and stored in a dessicator. For sufficiently high molar mass polyethylene oxide the resulting composites are semicrystalline and opaque at room temperature. Wide angle X-ray scattering shows the silicate layers to be exfoliated or partially exfoliated at all compositions, that is from 0.2 to 15 wt % sodium montmorillonite.

Processing with n-methyl pyrilidone, methanol and many other polar organic solvents may be used to obtain similar results to methods 2 and 3. In the absence of the HBP, exfoliation is not obtained in the linear polymers referred to using the processing routes described in methods 4 and 5.

When shear is employed for exfoliation of intercalated materials produced by the above methods or for blending of the intercalated materials with other materials, or for producing intercalated materials directly from the starting components, any technique that can be used to apply shear to the intercalant carrier composition is appropriate. Shear can be provided, for example, by direct mechanical means, by thermal shock or by sonication. In procedures of particular practical importance, the intercalate or exfoliate, with or without the carrier or solvent and with or without one or more additional components can be sheared using stirrers, Banbury™ type mixers.

Brabender™ type mixers, long continuous mixers or extruders, for example. In processes based on thermal shock, shear is achieved by raising or lowering the temperature of the material, causing thermal expansions and hence internal shear stresses. In ultrasonic techniques, cavitation or resonant vibrations cause different regions of the composition to vibrate out of phase and thus be subjected to shear. These examples are intended to be illustrative, and any other appropriate method for applying shear to the material may be used.

Example 6

Method for Exfoliated and Intercalated Silicates in a Crosslinked Polyurethane Matrix Two, three or four pseudo-generation HBP containing 5 to 30 wt % sodium montmorillonite is carefully dried, pre-heated to 150° C. and mixed at 100 to 130° C. with between 60 and 90 wt % of a liquid diol or an oligomeric diol such as oligomeric poly ethylene glycol (molar mass 500 to at least 2000 g/mol) or a polyol such as trimethylolpentane. The resulting blend is mechanically mixed with a stochiometric amount of MDI and poured into a suitable mould. The mixture is cured at between 50 and 150° C. under pressure to give a hydrophobic glassy amorphous solid. Wide angle X-ray scattering and transmission electron microscopy show the initial exfoliated state of the silicate layers to be maintained.

Example 7

Method for Exfoliated and Intercalated Silicates in an HBP-graft-PCL Star Shaped Polymer Matrix Two, three or four pseudo-generation HBP containing 5 to 30 wt % sodium montmorillonite is carefully dried, pre-heated to 150° C. and mixed at 100° C. with at least 50 wt % of distilled ε-caprolactone. After dissolution/dispersion of the HBP/layered silicate in the monomer a catalytic amount of stannous-ethylhexanonenate is added to the mixture and the reaction allowed to go to completion (110° C. for not more than 22 h) to give a star shaped HBP-graft-PCL polymer with arm lengths depending on the initial HBP/ε-caprolactone ratio. Wide angle X-ray scattering and transmission electron microscopy show the initial exfoliated state of the silicate layers to be maintained.

The references cited herein are all expressly incorporated by reference.

The invention claimed is:

1. A method of producing an intercalate or exfoliate, the method comprising mixing a layered material with a dendritic polymer in a solvent and drying said intercalate or exfoliate.

2. The method of claim 1, wherein intercalation takes place in the absence of onium ions, silanes or other low molar mass or monomeric coupling agents.

3. The method of claim 1, wherein the layered material constitutes less than 75 wt % of the intercalate or exfoliate.

4. The method of claim 1, wherein the layered material is a layered silicate.

5. The method of claim 1, wherein the layered silicate is sodium montmorillonite.

6. The method of claim 1, wherein the dendritic polymer has one or more functional end groups.

7. The method of claim 1, wherein the dendritic polymer has an average of at least 16 end groups per molecule.

8. The method of claim 6, wherein the end groups are hydroxyl, thiol or amine groups.

9. The method of claim 1, wherein the dendritic polymer is a hyperbranched polymer having a polydispersity which is less than 5.

10. The method of claim 1, wherein the spacing between adjacent layers is approximately equal to the unperturbed molecular diameter of the polymers.

11. The method of claim 1, further comprising reacting the end functional groups of the dendritic polymer in the intercalate or exfoliate.

12. The method of claim 11, wherein the end functional groups are reacted to crosslink them.

13. An intercalate or exfoliate produced by the method of claim 1.

14. A method of producing a composite material which is a gel or pourable liquid, the method comprising:
  (i) providing an intercalate or exfoliate formed by contacting a layered material and a dendrite polymer so that molecules of the dendritic polymer are intercalated between adjacent spaced layers of the layered material; and
  (ii) dispersing said intercalate or exfoliate in a solvent to produce said gel or pourable liquid.

15. The method of claim 14, wherein the solvent is water or tetrahydrofuran.

16. The method of claim 14, further comprising the initial step of drying the intercalate or exfoliate.

17. The method of claim 14, wherein the intercalate or exfoliate is dispersed in a solvent to produce a thixotropic gel.

18. The method of claim 14, wherein the intercalate or exfoliate is dispersed in a solvent to produce a solution or suspension.

19. A method of producing a composite material, the method comprising:
  (i) providing an intercalate or exfoliate formed by contacting a layered material and a dendrite polymer so that molecules of the dendritic polymer are intercalated between adjacent spaced layers of the layered material; and
  (ii) crosslinking the dendritic polymer to form a crosslinked composite material.

20. The method of claim 19, wherein the dendritic polymer is crosslinked by mixing the intercalate or exfoliate with a diisocyanate.

21. A method of producing a composite material, the method comprising mixing a polymer matrix with an intercalate or exfoliate obtained by the method of claim 1 to produce the composite material.

22. The method of claim 21, wherein the polymer matrix is a thermoplastic polymer.

23. The method of claim 21, wherein the polymer matrix is polyethylene glycol, polyethylene oxide, polyacrylic acid, polyethylene, polypropylene, polystyrene or polymethyl methacrylate.

24. A composite material produced by the method of claim 14.

25. A composite material produced by the method of claim 19.

26. A composite material produced by the method of claim 21.

27. A composite material produced by the method of claim 23.

28. The method of claim 1, wherein the dendritic polymer is a dendrimer, a hyperbranched polymer, a polymer having dendron based architecture, a star shaped polymer or a star branched polymer, or a derivative of any of said polymers.

29. The method of claim 1, wherein the dendritic polymer has an average of at least 32 end groups per molecule.

30. The method of claim 1, wherein the dendritic polymer is an aliphatic polymer comprising hydroxyl end groups.

* * * * *